United States Patent Office 2,809,492
Patented Oct. 15, 1957

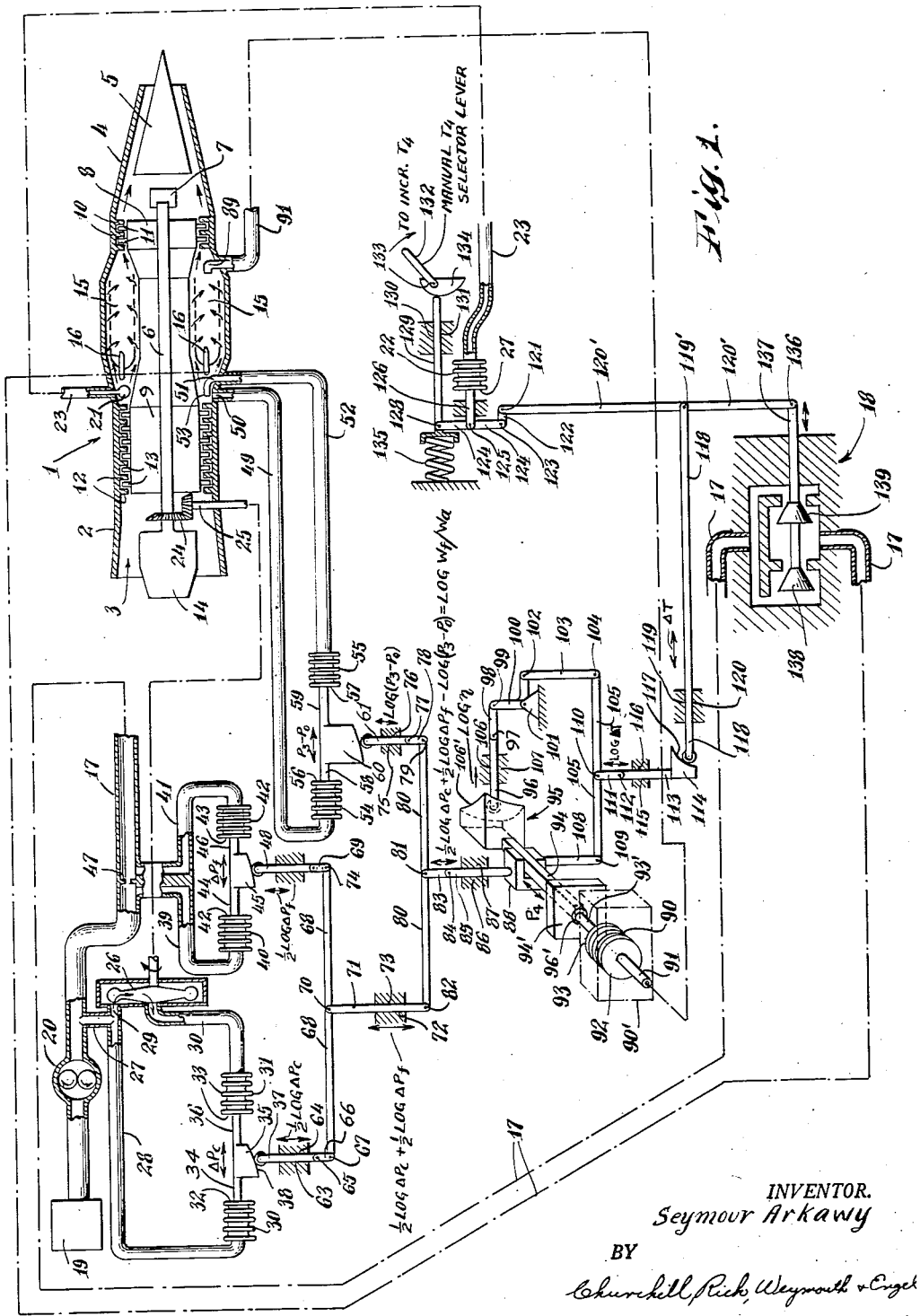

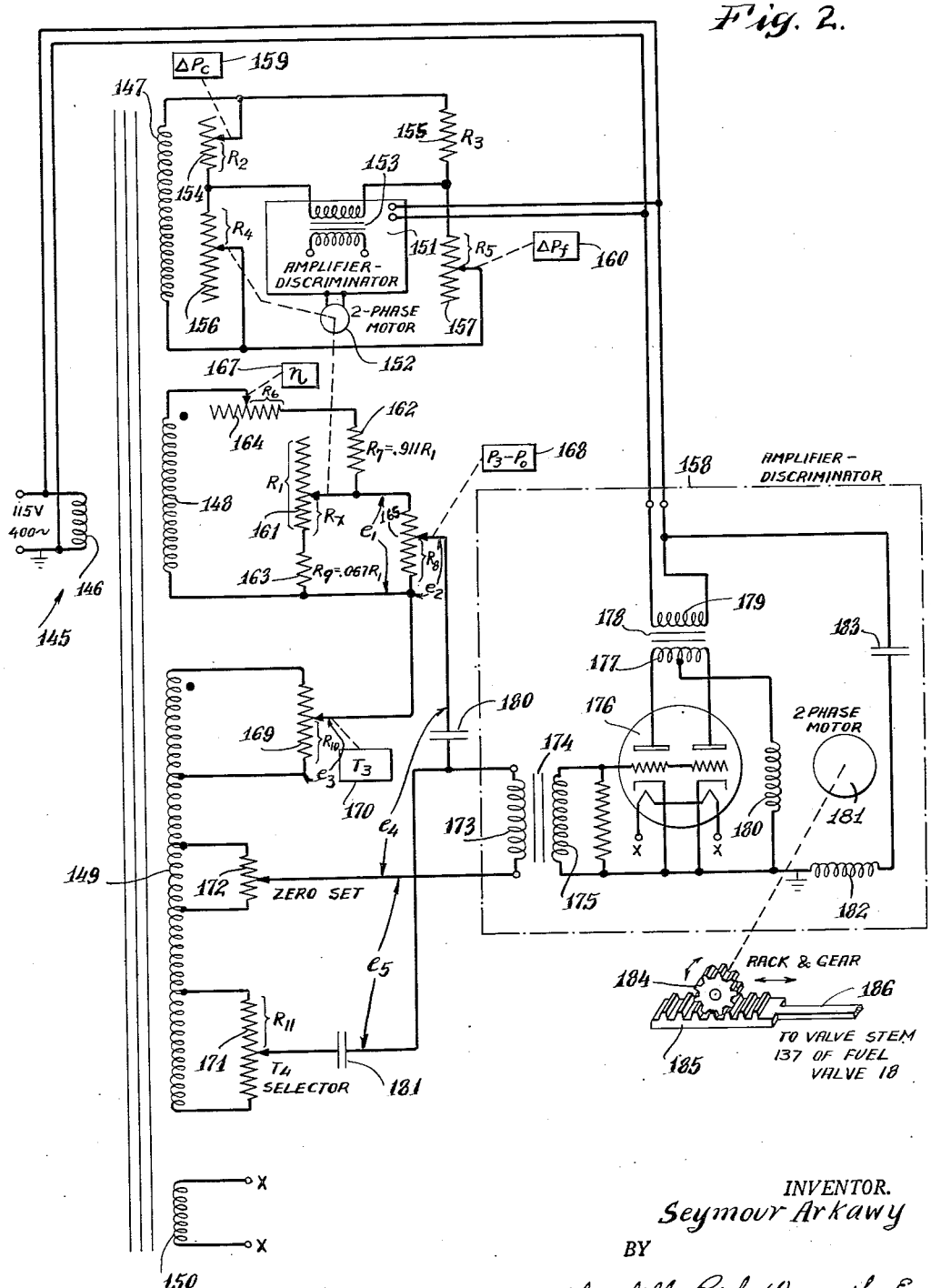

2,809,492

APPARATUS FOR MEASURING AND/OR CONTROLLING FUEL/AIR RATIO OF GAS TURBINES WITHOUT DIRECT GRAVIMETRIC FUEL METERING

Seymour M. Arkawy, Peekskill, N. Y., assignor to Simmonds Aerocessories, Incorporated, Tarrytown, N. Y., a corporation of New York Application December 23, 1952, Serial No. 327,597

14 Claims. (Cl. 60—39.28)

This invention relates to gas turbine type engines and particularly to systems for measuring and controlling the fluid/air ratio in gas turbines. More particularly, this invention relates to systems in gas turbines for synthesizing turbine-inlet temperature and for controlling such turbines in terms of turbine-inlet temperature.

Various methods are known for controlling the ratio of fuel to air supplied to the combustion chamber of a gas turbine plant. These methods control the fuel/air ratio by regulating either the fuel flow or the air flow. The fuel/air ratio by these known methods is usually controlled in terms of engine speed because of the ease of measuring speed by the use of centrifugal governors. The fuel flow is regulated so as to maintain a selected engine speed, an approximately linear relationship between thrust and throttle setting being possible. Another known method controls fuel flow by measuring air flow.

It is known that the temperature $T_4$ of the gases entering the gas turbine is equal to the sum of the temperature $T_3$ of the compressed air entering the combustion chamber plus the temperature rise $\Delta T$ in the chamber due to the fuel/air ratio of the mixture which burns in the chamber. Accordingly, methods for controlling fuel/air ratio in terms of a measured turbine-inlet temperature or total combustion chamber temperature $T_4$ are also known but have generally been found to be less desirable than speed control methods due to the difficulty encountered in reading the very high temperatures involved and due to the deteriorating effects of the high temperature upon direct temperature measuring devices. It is known to use a thermocouple to measure the tail-pipe gas temperature as an approximation of $T_4$ but this method is reliable only for limited cases. Attempts have also been made to synthesize turbine-inlet temperature or total combustion chamber temperature, but such arrangements have been much too complex and bulky for certain gas turbine installations, particularly for gas turbines used in aircraft. However, a turbine-inlet temperature control will produce an approximately linear power output with throttle position. Fixed tail area gas turbines may be controlled exclusively in terms of turbine-inlet temperature. Variable tail area gas turbines require control of both engine rotational speed and turbine-inlet temperature in order to obtain optimum economy and acceleration from the engine. However, in the advanced throttle positions corresponding to the normal and military rotational speed ratings, engine speed is maintained constant by automatic adjustment of the tail area and from that point on the turbine-inlet temperature is used for controlling the fuel/air ratio.

Certain of the known speed control and temperature control arrangements suffer from the significant effects of variation in fuel density caused for example by temperature changes, fuel contamination or the use in the same system of different fuels of varying chemical composition wherein the fuel density may vary as much as 20%. For example, in one known system where the fuel/air ratio is controlled in terms of a synthetic measurement of the turbine-inlet temperature, the fuel flow and air flow are each measured in a conventional manner and translated into opposing forces acting upon a servo valve which adjusts a variable tail cone or fuel valve to adjust the fuel/air ratio in an attempt to conform the actual turbine-inlet temperature to a selected turbine-inlet temperature. But such known arrangement does not measure the ratio of mass fuel flow to air flow since it merely employs a conventional fuel flow meter with no provision of means for compensating for variations in fuel density. Hence, when fuel density should for example increase, such increase will not be reflected in the measured fuel/air ratio and hence the turbine-inlet temperature will be correspondingly higher than the temperature selected by the pilot. Apart from inaccuracy of control over the entire operating range, at higher operating turbine-inlet temperatures, such absence of adequate compensation for fuel density changes would also permit the turbine-inlet temperature or total combustion chamber temperature to exceed the critical maximum allowable temperature and hence permit rapid deterioration of combustion chamber and/or turbine components.

There are many known types of flow meters which measure the volumetric rate of flow of a continuously flowing fluid. Such flow meters make use of the interaction between the continuously flowing fluid and a sensing element by such processes as measurement of the induced velocity of the sensing element, or measurement of the Doppler effect of sound velocity or, as is more common, obtaining dynamic pressure or head pressure indications. The pressure and head meters, such as the various forms or orifices, Venturi meters, Pitot tubes, weirs etc., make use of the following relationships:

I.
$$V_f = k_1 \sqrt{\frac{\Delta P_f}{\rho}}$$

and

II.
$$Q_f = k_2 \sqrt{\frac{\Delta P_f}{\rho}}$$

where $v_f$ is the velocity of flow, $Q_f$ is the volumetric flow, $k_1$ and $k_2$ are constants, $\Delta P_f$ is the indicated pressure differential and $\rho$ is the fuel density. Therefore, if fuel density remained constant, such meters could be calibrated in units of mass fuel flow as well as in units of volumetric flow, since mass fuel flow $W_f$ may be expressed as follows:

III.
$$W_f = k_2 \sqrt{\Delta P_f \rho}$$

However, in those installations where fuel density is apt to vary, the mass fuel flow reading of such meters will thus be in error by the square root of the fuel density ratio.

Since none of these flow meters will in itself measure the mass flow rate $W_f$ of an unknown fluid, other means have been devised in the past to accomplish direct gravimetric fuel metering (i. e. mass or weight measurement as contrasted with volumetric measurement). A fixed volume of fuel in an elastically suspended container may be weighed by strain gages, but this method yields weight rather than mass and thus necessitates employing means to compensate for the effects of acceleration, for example by means of auxiliary apparatus including a fixed reference weight with its own strain gage system.

In the copending patent application by myself and Stanley J. Smith Serial No. 155,192, filed April 11, 1950, now abandoned, there is described a meter for continuously measuring the mass density of a fluid of unknown chemical composition or of unknown temperature, which measurement is insensitive to changes in altitude or acceleration. Attempts have been made to provide systems for automatically combining volumetric fluid measurements with mass density measurements, such as that obtained for example by the above-mentioned patent application Serial No. 155,192, so as to convert automatically the volumetric fluid measurements into gravimetric fluid measurements unaffected by the influence of acceleration.

It is one object of the present invention to provide a means for measuring the fuel/air ratio in a gas turbine whereby such measurement will reflect changes in fuel density but without having to resort to the complexity of direct gravimetric fuel metering.

It is another object of the present invention to provide a means for computing the ratio of mass fuel flow to air flow without measuring mass fuel flow as such.

It is a further object of the present invention to provide a means for synthesizing the temperature rise in the combustion chamber due to combustion so that effects of variation in fuel density are automatically compensated for without direct gravimetric fuel metering.

It is a further object of the present invention to provide a means for synthesizing the combustion chamber total temperature or turbine-inlet temperature so that automatic compensation is made for variations in fuel density without directly measuring fuel density.

It is a further object of the present invention to provide a simplified means for deriving a mechanical force or displacement which is an index of the fuel/air ratio and of combustion chamber temperature.

It is a further object of the present invention to provide a simplified means for deriving a voltage which is an index of the fuel/air ratio and of combustion chamber temperature.

It is a still further object of the present invention to provide a means for regulating the fuel/air ratio in a gas turbine so that the actual ratio of mass fuel flow to air flow substantially conforms to a selected ratio of mass fuel flow to air flow irrespective of variations in fuel density.

It is a still further object of the present invention to provide a means for maintaining a predetermined combustion chamber temperature by controlling the ratio of mass fuel flow to air flow without direct gravimetric fuel metering.

It is a still further object of the present invention to provide a means for controlling the combustion chamber temperature by regulating the fuel air ratio so that the actual combustion chamber temperature substantially conforms to a selected combustion chamber temperature irrespective of variations in fuel density.

The foregoing and other objects and advantages will become apparent in view of the following description taken in conjunction with the drawings, wherein:

Figure 1 illustrates diagrammatically a gas turbine power plant associated with mechanical apparatus embodying one form of the present invention; and Fig. 2 illustrates electrical apparatus embodying another form of the present invention.

In order to accomplish the objects of the present invention an expression for the ratio of mass fuel flow to mass air flow must be derived in terms of measurable parameters which involve neither the measurement of fuel density nor the measurement of mass fuel flow. The disadvantages inherent in any metering or control system which requires direct gravimetric fuel metering should be apparent from the above discussion.

If fuel flow is measured with say a head type fuel meter such as a standard calibrated orifice or a Venturi meter, then the expression for mass fuel flow $W_f$ is given by Equation III, $\Delta P_f$ being the pressure differential or drop across the orifice or Venturi throat. In order to cancel mathematically the fuel density term $\sqrt{\rho}$ from the numerator of a fraction expressing the ratio of mass fuel flow $W_f$ to mass air flow $W_a$, an expression for mass air flow $W_a$ must be found which also is proportional to $\sqrt{\rho}$. This may be accomplished in accordance with the present invention by employing a known relationship in which the weight of air or mass air flow $W_a$ in a gas turbine provided with a compressor of either the axial, centrifugal or mixed flow type may be expressed as follows:

IV. $$W_a = k_3 \frac{(P_3 - P_0)}{N}$$

where $k_3$ is a constant, $P_3$ is the total air pressure at a representative point in the compressor or at a representative point in the immediate discharge region of the compressor, $P_0$ is the static air pressure at the same point, and $N$ is rotational speed of the engine and of the compressor rotor.

The engine speed $N$ may be measured by employing a low-flow centrifugal impeller which is adapted to receive fuel and to be driven by the turbine shaft so that the output pressure or pressure differential $\Delta P_c$ may be expressed as follows:

V. $$\Delta P_c = k_4 \rho N^2$$

where $k_4$ is a constant, $\rho$ is the fuel density and $N$ is the turbine speed and the impeller speed.

Solving Equation V for $N$, the following expression is obtained:

VI. $$N = k_5 \sqrt{\frac{\Delta P_c}{\rho}}$$

where $k_5$ is a constant.

By combining Equations III, IV and VI, the following expression for the fuel/air ratio may be obtained:

VII. $$\frac{W_f}{W_a} = \frac{k_2 \sqrt{\Delta P_f \rho}}{\frac{k_3 (P_3 - P_0)}{k_5 \sqrt{\frac{\Delta P_c}{\rho}}}}$$

By clearing fractions, it can be seen that the fuel density term $\rho$ drops out and that the following expression results for the fuel/air ratio:

VIII. $$\frac{W_f}{W_a} = k_6 \frac{\sqrt{\Delta P_f \Delta P_c}}{P_3 - P_0}$$

Thus, an expression has been evolved for the fuel/air ratio which reflects changes in fuel density but which may be computed in terms of easily measured pressures without requiring measurement of the fuel density $\rho$, or of mass fuel flow as such. The advantages of dispensing with direct gravimetric fuel metering become even more significant when one considers the fact that the temperature rise in the combustion chamber due to combustion is directly proportional to the fuel/air ratio and that such special measurement of the fuel/air ratio thus lends itself readily to a method of maintaining a predetermined combustion chamber temperature with automatic compensation for changes in fuel density.

The temperature rise $\Delta T$ in the combustion chamber due to combustion is given by the following expression:

IX. $$\Delta T = k_7 c_p \eta \frac{W_f}{W_a}$$

where $k_7$ is a constant, $c_p$ is the specific heat of the combustible gas in the chamber and $\eta$ is the combustion efficiency of the combustion chamber. The range of variation in the values of $c_p$ is so small that the term may be safely scheduled into the fuel/air ratio. Thus, Equation IX becomes:

X. $$\Delta T = k_8 \eta \frac{W_f}{W_a}$$

The combustion efficiency $\eta$ may be closely approximated in terms of combustion chamber total pressure and the fuel/air ratio.

As previously stated, the total combustion chamber temperature $T_4$ is equal to the sum of the temperature rise $\Delta T$ in the combustion chamber due to combustion plus the temperature $T_3$ of the air delivered by the compressor to the combustion chamber. $T_3$ is generally low enough and its variation slow enough that it may be readily measured directly. By employing Equation X as the expression for $\Delta T$, the expression for $T_4$ becomes:

XI. $\qquad T_4 = T_3 + \Delta T = T_3 + k_8 \eta \dfrac{W_f}{W_a}$

Systems will now be described for measuring the fuel/air ratio, $\Delta T$ and $T_4$ so that changes in fuel density are detected without direct gravimetric fuel metering and for controlling the gas turbine accordingly.

Referring to Fig. 1, there is shown diagrammatically a gas turbine engine 1 having an outer casing 2 defining at its forward end an opening 3 for receiving ram air, a tapered tail portion 4 through which the exhaust gases pass, and a tail cone 5. A suitably mounted central shaft 6 which is terminated at one end in bearing 7 is connected to a turbine 8 and to an axial flow compressor 9. The turbine stator blades are indicated at 10 and the rotor blades at 11. The compressor stator blades are indicated at 12 and the rotor blades at 13. The engine starting apparatus and other auxiliary equipment is indicated generally at 14. A combustion chamber is indicated at 15 and is provided with perforations as shown to admit the air supplied by the compressor. Fuel nozzles 16 are provided for injecting fuel into the combustion chamber. Fuel is supplied to the nozzles 16 by fuel line 17 which has in series therewith a servo-controlled fuel control valve 18 to be described hereinafter in greater detail. The rest of the fuel supply system comprises fuel reservoir 19 from which fuel is drawn off to the inlet of the fuel pump 20 supplying fuel under pressure to fuel line 17.

A temperature responsive device 21 is positioned in the engine so as to measure directly the temperature $T_3$ of the air supplied by the compressor to the combustion chamber. The bulb of device 21 may be filled with mercury or any suitable servo fluid which expands with increased temperature. The expansible servo fluid of device 21 communicates with bellows 22 by means of conduit 23 so that changes in the air temperature $T_3$ will result in corresponding movement of the movable wall 27 of bellows 22.

Apparatus for measuring the differential pressure $\Delta P_c$ of Equations V and VIII will now be described. Mechanically coupled to shaft 6 by means of bevel gears 24 and shaft 25 is a low-flow centrifugal impeller shown diagrammatically at 26. Conduit 27 is provided to tap off fuel from fuel line 17. Part of the fuel tapped from line 17 occupies conduit 28 and bellows 30 while the balance of the tapped fuel communicates with conduit 30 and bellows 31 via conduit 29 and the impeller 26. The movable wall 32 of bellows 30 and the movable wall 33 of bellows 31 are secured respectively to members 34 and 36. Members 34 and 36 in turn are secured to a logarithmic cam 35 so as to exert on such cam opposing lateral forces corresponding respectively to the instantaneous fuel pressures in conduits 28 and 30. The difference between the instantaneous fuel pressures in conduits 28 and 30 corresponds to the instantaneous output pressure or pressure differential $\Delta P_c$ across the impeller 26 and is directly proportional to the fuel density $\rho$ and the square of the impeller speed, as set forth in Equation V. It can thus be seen that the instantaneous lateral position of the logarithmic cam 35 depends upon the instantaneous value of $\Delta P_c$. A vertically disposed cam follower 37 is positioned so as to be in continuous engagement with the bottom surface 38 of cam 35. The bottom surface of cam 35 is calculated and generated in such manner that cam 35 will impart a vertical displacement to the follower 37 which is directly proportional to one half the logarithm of $\Delta P_c$. The reason for measuring $\Delta P_c$ in terms of a logarithmic quantity will hereinafter become apparent.

Apparatus for measuring $\Delta P_f$ of Equations III and VIII will now be described. In series with the fuel line 17 is a standard calibrated orifice 47 for metering the fuel flow. The mathematical expression for fuel flow through such an orifice is given by Equations II and III. $\Delta P_f$ is the fuel pressure differential or drop across this orifice. Fuel is tapped from the upstream side of orifice 47 and communicates via conduit 39 with bellows 40, while fuel tapped from the downstream side of the orifice communicates via conduit 41 with bellows 42. The difference between the instantaneous fuel pressures in conduits 39 and 41 corresponds to the instantaneous value of $\Delta P_f$. The movable walls 42 and 43 respectively of bellows 40 and 42, the members 44, 46, the logarithmic cam 45 and the cam follower 48 are all similar in design and operation to the walls 32 and 33, the members 34 and 36, the logarithmic cam 35 and the cam follower 37 respectively of the previously described $\Delta P_c$ measuring apparatus. It can thus be seen that the instantaneous lateral position of logarithmic cam 45 depends upon the instantaneous value of $\Delta P_f$. Cam 45 will impart a vertical displacement to the follower 48 which is directly proportional to one half the logarithm of $\Delta P_f$.

Next will be described apparatus for measuring the quantity $(P_3 - P_0)$ of Equations IV and VIII. The quantity $(P_3 - P_0)$ is a special air pressure differential at a representative point in the compressor preferably at an intermediate compressor stage for best accuracy or in the immediate discharge region of the compressor, $P_3$ being a special total air pressure at such point and $P_0$ being the static air pressure at the same point. Such points have been determined experimentally. For purposes of illustration in Fig. 1 the pick-up apparatus is shown in the immediate discharge region. Conduit 49 is a static air pressure conduit having a pick-up portion 50 for registering the static air pressure, portion 50 being seated in the engine casing 2 at a point between the compressor discharge and fuel nozzles and being radially disposed with respect to the central engine shaft 6. At the same point there is positioned a total pressure pick-up tube 51 forming one end of the total air pressure conduit 52. Pick-up tube 51, whether in the compressor or in the discharge region, is positioned so that the axis of its tip 53 coincides with a special resultant air velocity vector. This air velocity vector is the resultant geometric mean of the two component air velocities in the stream of air on the discharge side of the compressor, one being the tangential air velocity component and the other being a component which is perpendicular to the tangential component, the tangential component, the perpendicular component and the resultant vector all lying in the same plane. Thus, in an axial type compressor, the tip of the total air pressure tube would be positioned to coincide with the air velocity vector which is the resultant geometric mean of the tangential air velocity component and the axial air velocity component; whereas in a centrifugal type compressor, the tip of the total air pressure tube would be positioned to coincide with the air velocity vector which is the resultant geometric mean of the tangential air velocity component and the radial air velocity component.

Conduit 49 supplies static air pressure to bellows 54 while conduit 52 supplies total air pressure to bellows 55. The movable walls 56 and 57 respectively of bellows 54 and 55, the members 58 and 59, the logarithmic cam 60 and the cam follower 61 are all similar in design and operation to the corresponding elements of the previously described $\Delta P_c$ measuring apparatus except that the logarithmic cam 60 has its cam surface 62 reversed to provide a reversal of sign and is dimensioned so that follower 61 is given a vertical displacement which is proportional to the logarithm of the instantaneous lateral position of cam 60 rather than to one half the logarithm thereof. It can thus be seen that the instantaneous lateral position of cam 60 depends upon the instantaneous value of the air pressure differential $(P_3 - P_0)$ and that cam 60 will impart a vertical displacement to the follower 61 which is inversely proportional to the logarithm of $(P_3 - P_0)$.

The apparatus by which the vertical displacements of cam followers 37, 48 and 61 are combined to yield a displacement which is a function of the fuel/air ratio will now be described. Cam follower 37 is maintained in a vertical position by means of guide members 63, 64. Pivotally attached to follower 37 at point 65 is a bar link 66. Bar link 66 in turn is pivotally attached at point 67 to lever 68. Cam follower 48 is similarly coupled to lever 68 by means of bar link 69. Lever 68 is pivotally attached at its center portion 70 to link 71 which is positioned vertically between guide members 72, 73.

In the illustrated embodiment the impeller 26 is arranged to lower the pressure in conduit 30. Therefore if for example $\Delta P_c$ should increase, then logarithmic cam 35 will move laterally to the right thereby causing cam follower 37 to move downward a corresponding amount. The downward movement of follower 37 causes the left-hand end of lever 68 correspondingly to move downward about its right-hand end 74 as a pivot point. The extent of downward movement of lever 68 is transmitted to link 71 which also is moved downwardly a corresponding amount. Similarly, if $\Delta P_f$ should also increase, logarithmic cam 45 will move laterally to the right, forcing cam follower 48 to move downward. The downward movement of follower 48 causes the right-hand end of lever 68 correspondingly to move downward about its left-hand end 67 as a pivot point, thus giving link 71 a further downward movement which is in addition to the displacement produced by an increase in $\Delta P_c$. It can thus be seen that the vertical forces exerted on lever 68 by followers 37 and 48 are additive for the same direction of change in $\Delta P_c$ and $\Delta P_f$ and that the displacement of link 71 is always proportional to the sum of one half the logarithm of $\Delta P_c$ plus one half the logarithm of $\Delta P_f$.

Cam follower 61 is maintained in a vertical position by means of guide members 75, 76. Pivotally attached to follower 61 at point 77 is bar link 78. Bar link 78 in turn is pivotally attached at point 79 to lever 80. The other end of lever 80 is pivotally attached to link 71. Lever 80 is pivotally attached at its center portion 81 to link 83 which in turn is pivotally attached to link 85. Link 85 is maintained in a vertical position by means of guide members 86 and 87.

If for example the air pressure differential $(P_3-P_0)$ should increase, then the logarithmic cam 60 will move laterally to the left thereby causing cam follower 61 to move upward a corresponding amount. The upward movement of follower 61 causes the right-hand end of lever 80 correspondingly to move upward about its left-hand end 82 as a pivot point, thus causing upward movement of links 83 and 85. It can thus be seen that the vertical force exerted by follower 61 upon lever 80 is in opposition to the vertical forces exerted by followers 37 and 48 for the same direction of change in $\Delta P_c$, $\Delta P_f$ and $(P_3-P_0)$ and that the vertical displacement of link 85 is always proportional to the sum of one half the logarithm of $\Delta P_c$ plus one half the logarithm of $\Delta P_f$ minus the logarithm of $(P_3-P_0)$. The logarithm of the product of two quantities is equal to the sum of the logarithms of each quantity. The logarithm of the square root of a quantity is equal to one half the logarithm of such quantity. The logarithm of the quotient of two quantities is equal to the difference between the logarithms of each quantity. Thus, by an inspection of Equation VIII it becomes evident that the vertical displacement of link 85 is also proportional to the logarithm of the ratio of mass fuel flow to mass air flow.

As expressed by Equation X, the temperature rise $\Delta T$ due to combustion is directly proportional to the combustion efficiency $\eta$ as well as to the fuel/air ratio. As previously stated, combustion efficiency $\eta$ may be closely approximated in terms of the combustion chamber total pressure and the fuel/air ratio. Accordingly, there is placed in the combustion chamber a pick-up tube 89 so positioned that it registers the total combustion chamber pressure, $P_4$. The combustion chamber total pressure is communicated to bellows 90 via conduit 91. Alternatively, pick-up tube 89 may be dispensed with and conduit 91 tied into conduit 52 to pick-up $P_3$ at the compressor instead. Bellows 90 is hermetically enclosed by the evacuated housing 90' to convert the pressure exerted against movable wall 93 into absolute units, conduit 91 passing through the front of housing 90' in an air-tight manner. The movable wall 93 is secured to a rod 93' which passes in an air-tight manner through the rear of housing 90'. Rod 93' has a roller 96' adapted to bear against the vertical surface of a portion 94' integral with bar 94. Bar 94 is slidably fitted within the yoke member 88 which is secured at its upper end to link 85. Where desired, a suitable servo device may be interposed between bellows 90 and bar 94. Yoke 88 at its lower end is attached to link 108. Link 108 is pivotally attached to the left-hand end 109 of lever 105. Bar member 94 is secured to the warped logarithmic cam 95. Cam 95 is provided with an irregular or warped cam surface 106' which may be generated and is so formed that cam follower 96, which is maintained horizontally by guides 106, 107, is given a lateral displacement which is a function both of the log of the fuel/air ratio and also of the log of the combustion chamber total pressure $P_4$ whereby the displacement of follower 96 is made proportional substantially to the log of $\eta$. For example, if the fuel/air ratio increases so as to move link 85 and yoke member 88 downward, then cam 95 also will move downward and displace follower 96 over surface 106' along a sloped non-logarithmic path a corresponding amount to the right; and if the combustion chamber total pressure should also change so as to move bar 94 in a direction into the paper of the drawing, then cam 95 will be moved in the same direction thereby displacing follower 96 over surface 106' along a logarithmic path so as to be moved still further to the right. The displacement of follower 96 is thus made proportional substantially to the log of the combustion efficiency term $\eta$. Pivotally attached to follower 96 at point 97 is a link 98. Link 98 is pivotally attached at point 99 to bell crank 100 pivotally anchored at point 101. Bell crank 100 is pivotally connected at 102 to link 103 which in turn is pivotally attached to lever 105 at its right-hand end 104. Pivotally connected to the center 110 of lever 105 is link 111 which is pivotally attached at point 112 to link 113 positioned vertically between guide members 115, 116.

For an increase in $\eta$ the right-hand end of lever 105 will move downward about its left-hand end 109 as a pivot point; and for an increase in the fuel/air ratio the left-hand end of lever 105 will move downward about its right-hand end as a pivot point. It can be seen that the vertical displacement of link 113 is directly proportional to the sum of the logarithm of $W_f/W_a$ plus the logarithm of $\eta$, and thus by Equation X it is evident that the vertical displacement of link 113 is also directly proportional to the logarithm of the temperature rise $\Delta T$ due to combustion.

Secured to link 113 is an anti-logarithmic cam 114 having a logarithmic surface 117 in continuous engagement with cam follower 118 which is maintained in a horizontal position by guide members 119, 120. Cam 114 is so dimensioned that it imparts a lateral displacement to follower 118 which is proportional to the anti-logarithm of the displacement of link 113 and cam 114 and which is proportional to the anti-logarithm of the logarithm of $\Delta T$. It can thus be seen that the displacement of follower 118 is directly proportional to $\Delta T$, and since $\Delta T$ is directly proportional to the actual fuel/air ratio $W_f/W_a$, the displacement of follower 118 is also directly proportional to $W_f/W_a$.

Pivotally connected to the end 119' of follower 118 is lever 120'. The upper end 121 of lever 120 is pivotally coupled to the lower end 123 of a lever 124 by means of bar link 122. The movable wall 27 of bellows 22 is secured to a horizontal member 126 having its outer end 125 pivotally connected to the center portion of lever 124.

The upper end 128 of lever 124 is pivotally connected to the outer end of cam follower 129 which is maintained in a horizontal position by means of guide members 130, 131. By means of compression spring 135, follower 129 is maintained in continuous engagement with the curved surface of cam 134. Cam 134 is rotatively mounted at point 133. Fixedly secured to cam 134 at point 133 is a lever 132 for manually selecting a desired turbine-inlet or total combustion chamber temperature T₄.

Lever 120' is pivotally attached at its lower end 136 to the valve stem 137 of the fuel flow control valve 18 which is in series with the fuel line 17 supplying fuel to the nozzles. Valve 18 is of the balanced type having twin valve heads 138 and 139 which open and close the valve in unison. Where desired, a suitable servo or follow-up device may be inserted between valve stem 137 and the lower end 136 of lever 120.

If for example the actual value of $W_f/W_a$ or of $\Delta T$ should increase, with no change in the position of manual temperature selector lever 132, then cam follower 118 will move to the right, causing the lower end of lever 120' to move to the right about its upper end 121 as a pivot point. Valve stem 137 will correspondingly move to the right and hence move valve heads 138 and 139 closer to their respective seats and thus decrease the fuel flow in compensation so as to return the actual value of $W_f/W_a$ or $\Delta T$ to the value which it had before the unwanted increase occurred.

If for example the compressor air temperature T₃ should increase, then such increase will be directly measured by device 21 and translated into an increased pressure acting outwardly against the movable wall 27 of bellows 22. Member 126 will thus move to the left causing the lower end of lever 124 to move to the left about its upper end 128 as a pivot point. Such movement of lever 124 will cause the upper end of lever 120' to swing correspondingly to the left about point 119 as a pivot and thus causes the lower end of lever 120' to move to the right a corresponding amount. Valve stem 137 will correspondingly move to the right and thus cause the valve heads 138 and 139 to move closer to their seats. The fuel flow will be decreased correspondingly in compensation so as to decrease the actual value of $W_f/W_a$ or $\Delta T$ to a sufficiently lower value whereby the sum of $T_3 + \Delta T$ will be returned to the same value obtaining before the unwanted increase in compressor air temperature T₃ occurred.

Assume now that the operator or pilot desires to increase the fuel/air ratio so as to attain a predetermined higher temperature T₄. T₄ may be variously described as the turbine-inlet temperature or turbine motive gas temperature or as the combustion chamber total temperature. The mathematical expression for T₄ is given by Equation XI. The operator moves lever 132 downward until it reaches the position corresponding to the predetermined higher temperature T₄ which he is selecting, the range of selectable temperatures T₄ being read from a suitably calibrated dial mounted next to lever 132. The downward movement of lever 132 causes cam 134 to rotate correspondingly, thus forcing cam follower 129 to the left against the action of spring 135. Movement of follower 129 to the left causes the upper end of lever 124 to swing correspondingly about point 125 and thus causes the lower end of lever 124 to move to the right a corresponding amount. Lever 120' in turn will swing about point 119' as a pivot so that the lower end of lever 120' will move a corresponding amount to the left, thus moving the valve heads of fuel control valve 18 away from the seats. The fuel flow will thus be increased to an extent sufficient to increase the actual fuel/air ratio to the point where it equals the fuel/air ratio corresponding with the selected combustion chamber temperature T₄. When the actual temperature T₄ and the selected temperature T₄ are equal, then the force exerted on rod 137 by the displacements of follower 118 and member 126 will be equal and opposite to the force exerted on rod 137 by the displacement of follower 129 and the system will be in equilibrium until the position of lever 132 is again manually changed.

If fuel density should increase, $\Delta P_c$ will accordingly increase thereby moving cam 35 to the right and cam follower 37 downward corresponding amounts. This downward movement of follower 37 in response to an increase in fuel density will be transmitted by means of the above-described linkages to follower 118 which will be moved a corresponding amount to the right causing valve heads of fuel control valve 18 to move closer to the seats so as to maintain the same mass fuel flow and thus the same values of $W_f/W_a$, $\Delta T$ and T₄ that existed prior to the increase in fuel density.

An electrical system will now be described for computing in terms of voltages the fuel/air ratio, $\Delta T$ and T₄ so that, as in the mechanical system of Fig. 1, changes in fuel density will be detected without direct gravimetric fuel metering and for controlling the gas turbine accordingly.

Referring to Fig. 2, there is shown schematically a transformer 145 having its primary winding 146 connected to a source of alternating voltage, such as the 115 volt, 400 cycle supply line in the case of an aircraft. Transformer 145 has four secondary windings, windings 147, 148, 149 and 150 respectively. Windings 148 and 149 are wound so as to have the same polarity for a reason which will hereinafter become apparent. Secondary winding 147 is connected across the electrical input of a self-balancing bridge network comprising potentiometer 154 having a variable resistance value R₂, resistor 155 having a fixed resistance value R₃, potentiometer 156 having a variable resistance value R₄, potentiometer 157 having a variable resistance value R₅, an amplifier-discriminator circuit 151 and a 2-phase induction motor 152. The electrical output of the bridge is fed to the primary of a transformer 153 constituting the input to the amplifier-discriminator circuit 151. In the output of the amplifier-discriminator is the 2-phase induction motor 152 which is mechanically coupled to the wiper or arm of the potentiometer 156 for automatically rebalancing the bridge whenever R₂ or R₅ change in value. The amplifier-discriminator 151 can be of the same design as the amplifier-discriminator 158 shown in detail in Fig. 2 and subsequently to be described.

Potentiometer 154 is electrically connected in one arm of the bridge as shown and has its wiper or sliding arm mechanically coupled to a movable device 159 (indicated diagrammatically in block form) which has a mechanical displacement proportional to the impeller pressure rise $\Delta P_c$. For example, device 159 can be similar to the combination of the cam 35 and cam follower 37 with the wiper of potentiometer 154 being coupled to the lower end of follower 37, except that by the present embodiment the sloping surface 38 would be a linear sloping surface rather than logarithmic. Thus, the resistance value R₂ of potentiometer 154 is at all times proportional to $\Delta P_c$.

Potentiometer 157 is electrically connected in the arm of the bridge which is diagonally across from the arm containing R₂. The variable arm of potentiometer 157 is mechanically coupled to a movable device 160 which has a mechanical displacement proportional to the orifice fuel pressure drop $\Delta P_f$. For example, device 160 can be similar to the combination of the cam 45 and cam follower 48 with the wiper of potentiometer 157 being coupled to the lower end of follower 48, except that by the present embodiment the sloping surface of cam 45 would be a linear sloping surface rather than logarithmic. Thus, the resistance value R₅ of potentiometer 157 is at all times proportional to $\Delta P_f$. Potentiometer 156 and resistor 155 comprise the other two arms of the bridge.

When the bridge is balanced, there will be no voltage in the output of the bridge and therefore no input voltage to the amplifier-discriminator 151 and the relation between $R_2$, $R_3$, $R_4$ and $R_5$ may be expressed as follows:

XII. $$R_4 = \frac{R_2 R_5}{R_3}$$

If $R_2$ or $R_5$ should increase due to an increase in $\Delta P_c$ or $\Delta P_f$ respectively, then an unbalancing voltage will be established in the output of the bridge and on the input to the amplifier-discriminator which will cause motor 152 to rotate through an angle corresponding to the degree of unbalance and in a direction corresponding to the direction of unbalance. As motor 152 rotates, it correspondingly adjusts the arm of potentiometer 156 until there is again zero voltage in the output of the bridge and where Equation XII will again hold true. It can thus be seen that resistance value $R_4$ is continuously adjusted by motor 152 to a value which is proportional to the mathematical product of $R_2$ and $R_5$ and thus $R_4$ is also maintained proportional to the product of $\Delta P_c$ and $\Delta P_f$.

Also coupled to the shaft of motor 152 is the arm of potentiometer 161. It can be seen that the resistance value $R_x$ of potentiometer 161 is thus also proportional to the mathematical product of $\Delta P_c$ and $\Delta P_f$. Potentiometer 161 forms part of a known type electrical circuit for extracting the square root of a variable quantity. The square root circuit which is supplied with voltage from the secondary winding 148 comprises potentiometer 161 having a full resistance value of $R_1$ ohms, resistor 162 having a fixed resistance value $R_7$ which is equal to .911 of the full resistance value $R_1$ of potentiometer 161, and resistor 163 having a resistance value $R_9$ which is equal to .067 of the full resistance value $R_1$ of potentiometer 161. The output voltage $e_1$ of the square root circuit is proportional to the square root of the resistance value $R_x$ and hence $e_1$ is proportional to the square root of the mathematical product of $\Delta P_c$ and $\Delta P_f$.

In series with the square root circuit and the secondary winding 148 is the tandem potentiometer 164 having a variable resistance value $R_6$. The variable arm of potentiometer 164 is mechanically coupled to a movable device 167 which has a mechanical displacement proportional to the combustion efficiency $\eta$. For example, device 167 can be similar to the combination of cam 95 and follower 96 with the movable arm of potentiometer 164 being coupled to the right-hand end of follower 96, except that by the present embodiment the irregular surface 106 of cam 95 would not be shaped so as to extract the logarithm of the combustion chamber total pressure but would be shaped so as to extract the anti-logarithm of the fuel/air ratio, and the sloping surface of cams 35, 45 and 69 would be sloping linear surfaces rather than logarithmic. Thus, the resistance value $R_6$ of potentiometer 164 can be made always to vary inversely substantially with the combustion efficiency $\eta$. It can be seen that the output voltage $e_1$ of the square root circuit is thus directly proportional to the mathematical product of $\eta$ and the square root of the product of $\Delta P_c$ and $\Delta P_f$.

In parallel with the output of the square root circuit is a potentiometer 165 which serves as a voltage divider, dividing the voltage $e_1$ by a quantity proportional to the special compressor air pressure differential $(P_3-P_0)$. The variable arm of potentiometer 165 is mechanically coupled to a movable device 168 which has a mechanical displacement proportional to $(P_3-P_0)$. For example, device 168 can be similar to the combination of cam 60 and cam follower 61 with the movable arm of potentiometer 165 being coupled to the lower end of follower 61, except that by the present embodiment the sloping surface 62 of cam 60 would be a linear sloping surface rather than logarithmic. Thus, the resistance value $R_8$ of potentiometer 165 can be made always to vary inversely with $(P_3-P_0)$. It can thus be seen that by means of the electrical system explained so far, there is developed across the resistance $R_8$ of potentiometer 165 an output voltage $e_2$ which is directly proportional to the quotient of the square root of the product of $\Delta P_c$ and $\Delta P_f$ divided by $(P_3-P_0)$ and thus has solved Equation XIII for $W_f/W_a$. Since $e_2$ is also directly proportional to the product of the last mentioned quotient and $\eta$, Equation X also has been solved for $\Delta T$.

In parallel with a portion of the secondary winding 149 is connected the potentiometer 169. The movable arm of the potentiometer 169 is mechanically coupled to a movable device 170 which has a mechanical displacement proportional to the compressor discharge air temperature $T_3$. For example, device 170 can be similar to bellows 22 with the movable arm of potentiometer 169 being coupled to the movable wall 27 of bellows 22. Thus, the resistance value $R_{10}$ of potentiometer 169 is always proportional to $T_3$. Thus there is developed across the resistance $R_{10}$ of potentiometer 169 a voltage $e_3$ which is directly proportional to $T_3$. Since secondary windings 148 and 149 are wound so as to have the same polarity, it is also apparent from the circuit arrangement that the voltages $e_2$ and $e_3$ are added in series, together with a fixed pre-set voltage developed between the arm of zero-set potentiometer 172 and the bottom terminal of potentiometer 169, to produce a resultant output voltage $e_4$ which is directly proportional to the sum of $\Delta T$ and $T_3$ and, by Equation XI, is also directly proportional to the combustion chamber total temperature or turbine-inlet temperature $T_4$.

In parallel with another portion of secondary winding 149 is connected the potentiometer 171. The movable arm of potentiometer 171 is manually adjusted by the operator or pilot to yield a resistance value $R_{11}$ corresponding to whatever $T_4$ (or $W_f/W_a$ or $\Delta T$) value the pilot is manually selecting at the moment. Thus, there is developed between the movable arm of potentiometer 171 and the arm of zero-set potentiometer 172 a voltage $e_5$ which is always directly proportional to the selected $T_4$ temperature (or selected $W_f/W_a$ or $\Delta T$) and substantially 180° out of phase with the resultant voltage $e_4$.

In the input of the amplifier-discriminator 158 is a transformer 174 having one terminal of its primary winding 173 connected to the movable arm of the zero-set potentiometer 172. Connected to the other terminal of primary winding 173 via a series reference condenser 180 is the movable arm of potentiometer 165. Also connected to such other terminal of winding 173 via a series reference condenser 181 is the movable arm of $T_4$ selector potentiometer 171. Thus, across the primary winding 173 there appears two voltages, $e_4$ and $e_5$, $e_5$ being substantially 180° out of phase with $e_4$. The voltage $e_4$ is proportional to the actual combustion chamber total temperature or turbine-inlet temperature $T_4$ while $e_5$ is proportional to the selected combustion chamber total temperature or turbine-inlet temperature $T_4$. When $e_4$ is equal in magnitude to $e_5$, then there will be no resultant or unbalancing voltage across primary winding 173 and hence amplifier-discriminator 158 will be inoperative.

The secondary winding 175 of transformer 174 is connected to the grid circuit of a double triode vacuum tube 176, the grids and cathodes of which are galvanically tied together. The anodes of tube 176 are connected respectively to the end terminals of the secondary winding 177 of a transformer 178 having its primary winding 179 connected to the same supply source to which the primary 146 of transformer 145 is connected. The center-tap of secondary winding 177 is connected to one end of the control winding 180 of a 2-phase induction motor 181. Connected to one side of the supply source through a phasing condenser 183 is the reference winding 182 of motor 181 so that the current flowing through the reference winding 182 will be substantially 90° out of phase with the current flowing through the control winding at any instant. The direction and degree of rotation of motor 181 depends upon the direction and extent of unbalance of the voltages $e_4$ and $e_5$ across the primary of transformer 174. The shaft of motor 181 is coupled to the valve stem of fuel control valve 18 in such a manner that valve 18 is opened or closed an amount corresponding to the direction and degree of rotation of motor 181. For example, the shaft of motor 181 may be mechanically coupled to the gear 184 of a rack and gear arrangement, a portion 186 of the laterally movable rack 185 being coupled to the valve stem 137 of the valve 18 of Fig. 1.

It can be seen that the electrical system of Fig. 2 forms a closed-loop electrical servomechanism for maintaining a selected combustion chamber total temperature or turbine-inlet temperature $T_4$ (or a selected $W_f/W_a$ or $\Delta T$). Assume that at the outset the position of the $T_4$ selector potentiometer 171 is unchanged and that the actual temperature $T_4$ is equal to the selected temperature $T_4$. In such case $e_4$ will equal $e_5$ and thus the amplifier-discriminator 158 will be inoperative. If for example the measured value of $W_f/W_a$ or of $\Delta T$ or of $T_3$ or of $T_4$ should now suddenly increase, the system will operate as follows to compensate automatically for such increase. The voltage $e_4$ across primary 173 will correspondingly increase. An increase in $e_4$ will produce a resultant unbalancing voltage across primary 173 the magnitude of which is equal to the difference between the value of $e_5$ and the new higher value of $e_4$. Current will flow through control winding 180 causing motor 181 to rotate so as to move the valve heads of fuel valve 18 progressively closer to the seats and correspondingly to decrease progressively the fuel flow; and when this decrease in fuel flow has caused the measured value of $W_f/W_a$ or of $\Delta T$ to decrease to the point where $e_4$ again equals $e_5$, then motor 181 will stop rotating and the degree of opening in fuel valve 18 will be fixed at that point. Thus, a correction will have been automatically made for the increase in $W_f/W_a$ or in $\Delta T$ so as to restore $W_f/W_a$ or $\Delta T$ to the value it had before the increase occurred; and an increase in $T_3$ will have been compensated for by automatically decreasing $W_f/W_a$ or $\Delta T$ to an extent sufficient to restore the actual temperature $T_4$ to the value it had before the increase in $T_3$ occurred. In all cases the actual value of $T_4$ is automatically maintained constant for a given position of the $T_4$ selector potentiometer 171. Since the measurement of the fuel/air ratio and $\Delta T$ according to present invention reflects changes in fuel density, automatic compensation will take place even when the change in $W_f/W_a$ or in $\Delta T$ is caused solely by a change in the fuel density.

Assume that the system is again in equilibrium and that the pilot now moves the arm of $T_4$ selector potentiometer 171 downward so as to select a higher temperature $T_4$. There will now be developed across the resistance $R_{11}$ of potentiometer 171 an increased voltage and therefore the voltage $e_5$ will have a correspondingly higher value. The increase in $e_5$ will produce a resultant unbalancing voltage across primary 173 the magnitude of which is equal to the difference between the magnitude of $e_4$ and the new higher value of $e_5$. The polarity of the unbalancing voltage will be opposite to that of the unbalancing voltage established when $e_4$ exceeds the value of $e_5$. Thus, motor 181 will be rotated so as to move the valve heads of fuel valve 18 progressively farther away from the seats and correspondingly to increase progressively the fuel flow; and when this increase in fuel flow has caused the measured values of $W_f/W_a$, $\Delta T$ and $T_4$ to increase to the point where the value of $e_4$ equals the new higher value of $e_5$, then motor 181 will stop rotating and the degree of opening in fuel valve 18 will be fixed at that point. Thus, $W_f/W_a$ and $\Delta T$ have been automatically adjusted so that the actual value of $T_4$ (or of $W_f/W_a$ or $\Delta T$) conforms to a selected value of $T_4$ (or of $W_f/W_a$ or $\Delta T$).

It will be apparent that certain alternative methods and variations may be employed in practicing the present invention. Thus, instead of adjusting fuel flow in order to regulate the fuel/air ratio, known means may be connected to the left-hand end of rod 137 for adjusting air flow instead.

In the drawings, bellows have been used to convert pressure to mechanical displacements. It is obvious that diaphragms, Bourdon tubes, pistons etc. may be used in place of the bellows.

Similarly, although logarithmic cams have been employed in Fig. 1 for multiplying, dividing and extracting square roots, yet other non-linear devices may be employed instead. For example, the equation $Z=\sqrt{XY}$ may be solved by constraining Z to the surface of a right cone of axis $X=Y$, $Z=0$ and vertex at $X=0$.

One of the advantages derived from temperature control according to the present invention is that power output can be made linear or any desired function of pilot lever input throughout the operating range in a manner similar to the control characteristics of a reciprocating engine. The control lever 132 of Fig. 1 or the control lever coupled to potentiometer 171 of Fig. 2 may be used in a variable-area engine as the sole engine control lever for the pilot to operate. Such control lever for settings over the first portion of its range will be connected into the engine in a conventional manner so as to control speed, for example by indexing a centrifugal governor which regulates the fuel/air ratio, and for advanced settings over the last portion of its range such lever will be adapted to be automatically connected into the temperature control system of the present invention as illustrated in Figs. 1 and 2 so that the pilot may select temperature.

The temperature control of the present invention can be extended to include limiting of temperatures during transients of a fixed-area engine or used directly as a power control component of a variable-area engine. It should also be noted that the system of the present invention inherently provides a means for establishing limits for the fuel/air ratio, thus preventing blow-out.

While specific embodiments of the present invention have been described, it is apparent other modifications will occur to those skilled in the art, and it is to be understood that the specific embodiments are not presented by way of limitation but that the present invention comprehends all constructions coming within the scope of the appended claims.

What I claim is:

1. A control system for a gas turbine engine for maintaining a predetermined turbine motive gas temperature by controlling the ratio of mass fuel flow to air flow without direct gravimetric fuel metering, wherein there is provided a combustion chamber, a gas turbine responsively associated with the discharge outlet of said chamber, means for supplying a flow of air to said chamber, and a first conduit for supplying fuel to said chamber, said system comprising a restriction placed in said first conduit for developing a fuel pressure drop which is a function of fuel flow, a second conduit adapted to be supplied with fuel, means responsive to the rotational speed of said turbine and coupled to said second conduit for operative association with the fuel in said second conduit for developing a variable pressure which is both a function of fuel density and of turbine speed, means for measuring said fuel pressure drop, means for measuring said variable pressure, apparatus for computing the ratio of mass fuel flow to air flow in terms of said measured pressure drop and said measured variable pressure, and fuel/air ratio-adjusting means responsively coupled to the output of said ratio-computing apparatus for controlling the ratio of mass fuel flow to air flow to maintain said predetermined turbine motive gas temperature.

2. A system in a gas turbine engine for computing the ratio of mass fuel flow to mass air flow without direct gravimetric fuel metering wherein said engine has a combustion chamber, a gas turbine positioned to be driven by the gas from the output of said chamber, an air compressor driven by said turbine for supplying compressed air to said chamber, and a fuel supply passage for supplying fuel to said chamber, said system comprising a restriction placed in a section of said passage for developing a fuel pressure drop which is a function of fuel flow, a conduit adapted to be supplied with fuel, an impeller driven by said turbine and adapted to be supplied with fuel from said conduit, and computer means for computing said ratio in accordance with the following relationship $$\frac{W_f}{W_a} = k\frac{\sqrt{\Delta P_f \Delta P_c}}{P_3 - P_0}$$

where $W_f/W_a$ is the ratio of mass fuel flow to mass air flow, $k$ is a constant, $\Delta P_f$ is said fuel pressure drop, $\Delta P_c$ is the impeller pressure differential corresponding to the speed of rotation of said impeller, $P_3$ is the total air pressure and $P_0$ is the static air pressure at a representative point in the compressor, said representative point being selected such that the difference between the pressures $P_3$ and $P_0$ is a function of both the mass air flow and the speed of rotation of said turbine.

3. A system for synthetically measuring the temperature rise in a gas turbine engine combustion chamber due to combustion wherein said engine has a combustion chamber, a gas turbine positioned to be driven by the gas from the output of said chamber, an air compressor driven by said turbine for supplying compressed air to said chamber, and a fuel supply passage for supplying fuel to said chamber, said system comprising a restriction placed in a section of said passage for developing a fuel pressure drop which is a function of fuel flow, a conduit adapted to be supplied with fuel, an impeller driven by said turbine and adapted to be supplied with fuel from said conduit, computor means for computing the ratio of mass fuel flow to mass air flow in accordance with the following relationship $$\frac{W_f}{W_a} = k\frac{\sqrt{\Delta P_f \Delta P_c}}{P_3 - P_0}$$

where $W_f/W_a$ is the ratio of mass fuel flow to mass air flow, $k$ is a constant, $\Delta P_f$ is said fuel pressure drop, $\Delta P_c$ is the impeller pressure differential corresponding to the speed of rotation of said impeller, $P_3$ is the total air pressure and $P_0$ is the static air pressure at a representative point in the compressor, said representative point being selected such that the difference between the pressures $P_3$ and $P_0$ is a function of both the mass air flow and the speed of rotation of said turbine; means coupled to said computor means and to said engine for producing a first quantity having a magnitude which is a measure of the combustion efficiency of said combustion chamber, means coupled to said last mentioned means and to said computer means for obtaining a second quantity having a magnitude which is proportional to the mathematical product of the magnitude of said first quantity and said computed ratio, whereby the magnitude of said second quantity is a measure of said temperature rise.

4. A control system for a gas turbine for controlling the actual fuel/air ratio corresponding with the actual combustion chamber temperature so that the actual combustion chamber temperature is adjusted substantially to equal a selected combustion chamber temperature without direct gravimetric fuel metering, wherein there is provided a combustion chamber, a gas turbine positioned to receive the gas from the output of said chamber, an air compressor driven by said turbine for supplying compressed air to said chamber, and a fuel supply passage for supplying fuel to said chamber, said system comprising a restriction placed in a section of said passage for developing a fuel pressure drop which is a function of fuel flow, a conduit adapted to be supplied with fuel, an impeller driven by said turbine and adapted to be supplied with fuel from said conduit, computer means for computing said ratio in accordance with the following relationship $$\frac{W_f}{W_a} = k\frac{\sqrt{\Delta P_f \Delta P_c}}{P_3 - P_0}$$

where $W_f/W_a$ is the ratio of mass fuel flow to mass air flow, $k$ is a constant, $\Delta P_f$ is said fuel pressure drop, $\Delta P_c$ is the impeller pressure differential corresponding to the speed of rotation of said impeller, $P_3$ is the total air pressure and $P_0$ is the static air pressure at a representative point in the compressor, said representative point being selected such that the difference between the pressures $P_3$ and $P_0$ is a function of both the mass air flow and the speed of rotation of said turbine, means for measuring substantially the combustion efficiency of said combustion chamber, means for converting the measurement of combustion efficiency into a first quantity having a magnitude corresponding to said masurement of combustion efficiency, means coupled to said computer means for providing a second quantity similar in kind to said first quantity and having a magnitude corresponding to said ratio of $W_f/W_a$, means arranged to receive said first and second quantities for producing a third quantity having a magnitude which is the mathematical product of the magnitudes of said first and second quantities, means for selecting a fourth quantity similar in kind to said third quantity and having a magnitude corresponding to a selected combustion chamber temperature, means arranged to receive said third and fourth quantities for producing a fifth quantity similar in kind to said third and fourth quantities and having a magnitude which is the difference in the magnitudes of said third and fourth quantities, and control means operatively responsive to the magnitude of said fifth quantity for adjusting the actual fuel/air ratio to equal substantially the fuel/air ratio corresponding with said selected combustion chamber temperature.

5. A control system for a gas turbine for controlling the actual fuel/air ratio corresponding with the actual combustion chamber temperature so that the actual combustion chamber temperature is automatically adjusted to equal substantially a selected combustion chamber temperature, comprising a system for developing a first voltage having a magnitude which is proportional to the actual ratio of mass fuel flow to air flow, said system including apparatus for measuring the actual ratio of mass fuel flow to air flow in terms of the differential pressures across an orifice in the fuel line, across a low flow impeller in a supplementary fuel passage, and between a static and total pressure pick-up in the air compressor, whereby said ratio reflects variations in fuel density without direct gravimetric fuel metering and also including apparatus for translating the measured values of said differential pressures into said first voltage, means for developing a second voltage having a magnitude corresponding to a selected combustion chamber temperature, electrical servomechanism apparatus, electrical connections for applying said first voltage to the input of said servomechanism apparatus, electrical connections for applying said second voltage to the input of said servomechanism apparatus and with such polarity that said first and second voltages oppose each other at said input so that when the magnitudes of said voltages are equal there is produced in effect at said input a resultant unbalancing voltage of zero magnitude and when the magnitudes of said first and second voltages are unequal there is produced in effect at said input a resultant unbalancing voltage having a polarity determined by which one of said first and second voltages exceeds the other in magnitude and having a magnitude determined by the extent the magnitude of said one voltage exceeds the other, a reversible motor, said servomechanism apparatus having its electrical output electrically coupled to said motor to drive said motor in a direction and to an extent corresponding with the polarity and magnitude respectively of said resultant unbalancing voltage, and fuel/air ratio control means responsively coupled to the output of said motor for adjusting the actual fuel/air ratio to equal substantially the fuel/air ratio corresponding with said selected combustion chamber temperature at which time the magnitudes of said first and second voltages become equal to rebalance said servomechanism.

6. A control system for a gas turbine for controlling the actual fuel/air ratio corresponding with the actual combustion chamber temperature so that the actual combustion chamber temperature is automatically adjusted to equal substantially a selected combustion chamber temperature, comprising a system for developing a first voltage having a magnitude which is proportional to the actual ratio of mass fuel flow to air flow, said system including apparatus for measuring the actual ratio of mass fuel flow to air flow in terms of the differential pressures across an orifice in the fuel line, across a low flow impeller in a supplementary fuel passage, and between a static and total pressure pickup in the air compressor, whereby said ratio reflects variations in fuel density without direct gravimetric fuel metering and also including apparatus for translating the measured values of said differential pressures into said first voltage, means for measuring the temperature of the air supplied to said turbine, means for developing a second voltage having a magnitude proportional to said measured air temperature, means for adding said first and second voltages to obtain a third voltage having a magnitude equal to the sum of the magnitudes of said first and second voltages, means for developing a fourth voltage having a magnitude corresponding to a selected combustion chamber temperature, electrical servomechanism apparatus, electrical connections for applying said third voltage to the input of said servomechanism apparatus, electrical connections for applying said fourth voltage to the input of said servomechanism apparatus and with such polarity that said third and fourth voltages oppose each other at said input so that when the magnitudes of said third and fourth voltages are equal there is produced in effect at said input a resultant unbalancing voltage of zero magnitude and when the magnitudes of said third and fourth voltages are unequal there is produced in effect at said input a resultant unbalancing voltage having a polarity determined by which one of said third and fourth voltages exceeds the other in magnitude and having a magnitude determined by the extent the magnitude of said one voltage exceeds the other, a reversible motor, said servomechanism apparatus having its electrical output electrically coupled to said motor to drive said motor in a direction and to an extent corresponding with the polarity and magnitude respectively of said resultant unbalancing voltage, and fuel/air ratio control means responsively coupled to the output of said motor for adjusting the actual fuel/air ratio to equal substantially the fuel/air ratio corresponding with said selected combustion chamber temperature at which time the magnitudes of said third and fourth voltages become equal to rebalance said servomechanism.

7. Apparatus for controlling a gas turbine engine of the type having a turbine driven air compressor for supplying air to a combustion chamber supplied with liquid fuel, comprising measuring means coupled to the compressor and supplied with said fuel for providing a first control effect directly proportional to the product of the compressor speed and the mass of fuel supplied to said combustion chamber, means for measuring the differential between the static and total fluid pressures present at a representative point in said air compressor including means for converting the measurement into a second control effect, said representative point being selected such that the differential between the static and total fluid pressures is a function of both the mass air flow and the speed of rotation of said turbine, means for combining said first and second control effects to provide a control quantity directly proportional to the ratio of fuel-to-air existing in the engine, and means responsive to said control quantity for controlling said ratio of fuel-to-air to maintain the turbine input temperature at a preselected value without direct gravimetric fuel metering.

8. Apparatus according to claim 7 wherein said measuring means comprise apparatus for providing a third control effect in response to measurement of the drop in pressure across an orifice located in a conduit supplying the liquid fuel to the engine and thereby providing a quantity which is a direct function of the ratio of mass fuel flow squared to the fuel density.

9. Apparatus according to claim 8, wherein said measuring means further comprise a low-flow centrifugal impeller coupled with the air compressor and inserted in a conduit supplied with a representative quantity of the liquid fuel, means responsive to the pressure differential across said impeller for providing a fourth control effect which is a direct function of the product of the fuel density and the square of the compressor speed, and means for combining said fourth control effect with said third control effect in accordance with the expression $\sqrt{\Delta P_f \Delta P_c}$, wherein $\Delta P_f$ and $\Delta P_c$ represent, respectively, the quantities represented by said third and fourth control effects, thereby providing said first control effect.

10. Apparatus according to claim 9, wherein said means for combining said third and fourth control effects comprise first and second cam members operatively connected, respectively, with said apparatus and means for providing said third and fourth control effects, individual cam followers for said cam members, said cam members being provided with cam surfaces for effecting movement of the respective cam followers in proportion to one half of the logarithm of cam movement, and mechanical means linking said cam followers for producing an output equal to the algebraic sum of the movements of said cam followers.

11. Apparatus according to claim 7, wherein said last mentioned means comprise pressure sensitive means responsive to the combustion chamber total fluid pressure for providing an additional control effect, means for combining said control quantity with said additional control effect to produce an output effect proportional to the rise in temperature across said combustion chamber, means for increasing said output effect by an amount proportional to the temperature at the input of said combustion chamber, and means for controlling said ratio of fuel-to-air in accordance with the difference between said increased output effect and a preselected value to maintain said difference at a minimum.

12. Apparatus according to claim 11, wherein said means for producing an output effect comprise apparatus for developing a further quantity proportional to the product of the function represented by said control quantity and said additional control effect, said further quantity being proportional to the combustion efficiency of said engine, and means for combining said further quantity with said control quantity and thereby producing said output effect.

13. Apparatus for controlling a gas turbine engine of the type having a turbine driven air compressor for supplying air to a liquid fuel fed combustion chamber whose discharge drives the turbine comprising in combination a fuel line for feeding fuel to said chamber having a calibrated orifice therein, a low flow centrifugal impeller disposed in a supplementary fuel passage continually supplied with samples of said fuel and driven by said turbine, a total pressure pick-up and a static pressure pick-up disposed in said compressor at a point selected such that the difference between the pressures measured by said pick-ups, $P_3 - P_0$, is a function of both the mass air flow and the rotational speed of the turbine, first means for measuring the pressure drop $\Delta P_f$ across said orifice, second means for measuring the pressure differential $\Delta P_c$ across said impeller, means coupled to said first and second measuring means and to said pressure pick-ups for combining the outputs of each in accordance with the expression $$\frac{\sqrt{\Delta P_f \Delta P_c}}{P_3 - P_0}$$

for providing a control quantity which is a direct function of the ratio of the mass fuel flow to the mass air flow, and control means responsively coupled to said combining means for controlling said ratio to control said engine, whereby said ratio is measured and controlled without direct gravimetric fuel metering.

14. Apparatus for controlling a gas turbine engine of the type having a turbine driven air compressor for supplying air to a liquid fuel fed combustion chamber whose discharge drives the turbine comprising in combination a fuel line for feeding fuel to said chamber having a calibrated orifice therein for developing a fuel pressure drop which represents both a mass fuel flow function and an additional fuel density function, a total pressure pick-up and a static pressure pick-up disposed in said air compressor at a point selected such that the difference between the pressures measured by said pick-ups represents both a mass air flow function and a turbine rotational speed function, means for measuring said pressure drop across the orifice, and means coupled to said measuring means and to said pressure pick-ups for combining the outputs of each to provide an output effect which is a direct function of the ratio of the mass fuel flow to the mass air flow characterized by means disposed in a supplementary fuel passage continually supplied with samples of said fuel and responsive to the rotational speed of said turbine for developing a variable pressure which represents both a fuel density function and a turbine speed function, and means responsive to the variable pressure provided by said last mentioned means for eliminating from said output effect said additional fuel density function and said turbine speed function represented by said fuel pressure drop and said differential pick-up pressure, respectively, whereby said ratio is measured without direct gravimetric fuel metering.

References Cited in the file of this patent
UNITED STATES PATENTS

| | | |
|---|---|---|
| 2,542,499 | Fortescue | Feb. 20, 1951 |
| 2,545,703 | Orr | Mar. 20, 1951 |
| 2,581,276 | Mock | Jan. 1, 1952 |
| 2,592,385 | Borden et al. | Apr. 8, 1952 |
| 2,606,420 | Moore | Aug. 12, 1952 |
| 2,633,704 | Sarto | Apr. 7, 1953 |
| 2,641,105 | Drake | June 9, 1953 |
| 2,670,599 | Davies et al. | Mar. 2, 1954 |
| 2,673,556 | Reggio | Mar. 30, 1954 |